United States Patent [19]

Macht et al.

[11] Patent Number: 4,480,708
[45] Date of Patent: Nov. 6, 1984

[54] BRAKE SYSTEM

[75] Inventors: Jon A. Macht; Brian C. Clark, both of Owatonna, Minn.

[73] Assignee: Owatonna Manufacturing Company, Inc., Owatonna, Minn.

[21] Appl. No.: 447,666

[22] Filed: Dec. 7, 1982

[51] Int. Cl.³ .............................................. B62D 11/04
[52] U.S. Cl. ............................ 180/6.48; 188/72.7
[58] Field of Search ................. 180/6.48; 188/71.7, 188/72.7, 71.1, 71.5, 196 M

[56] References Cited

U.S. PATENT DOCUMENTS

| | | | |
|---|---|---|---|
| 1,708,440 | 4/1929 | Carhart | 192/82 R |
| 1,744,241 | 1/1930 | Pierle | 188/71.5 |
| 1,764,923 | 6/1930 | Wilson | 192/36 |
| 1,895,772 | 1/1933 | Rosenberg | 188/71.7 |
| 2,043,933 | 6/1936 | Sohl | 188/71.5 |
| 2,245,987 | 3/1940 | Lambert | 188/72.2 |
| 2,262,708 | 11/1941 | Lambert | 188/72.2 |
| 2,663,384 | 12/1953 | Chamberlain | 188/72.2 |
| 2,799,367 | 4/1954 | Dotto | 188/72.5 |
| 2,815,104 | 12/1957 | DuShane | 188/265 |
| 3,024,873 | 3/1962 | Wilkinson | 180/71.7 |
| 3,155,195 | 11/1964 | Brawerman | 188/72.8 |
| 3,204,713 | 9/1965 | Shanahan et al. | 180/6.48 X |
| 3,207,267 | 9/1965 | Beuchle et al. | 188/72.2 |
| 3,228,493 | 1/1966 | Kershner | 188/72.7 |
| 3,280,933 | 10/1966 | Jones | 180/253 |
| 3,498,418 | 3/1970 | Dewar | 188/71.5 |
| 3,500,968 | 3/1970 | Bosler | 188/72.7 |
| 3,675,741 | 7/1972 | Frei et al. | 188/16 |
| 3,877,550 | 4/1975 | Hahn | 188/71.4 X |
| 3,980,237 | 9/1976 | Griesenbrock | 303/84 A |
| 3,997,033 | 12/1976 | Bulmer | 180/72.7 |
| 4,039,051 | 8/1977 | Otto | 188/72.1 |
| 4,124,084 | 11/1978 | Albright et al. | 180/6.48 |

Primary Examiner—John A. Pekar
Attorney, Agent, or Firm—Merchant, Gould, Smith, Edell, Welter & Schmidt

[57] ABSTRACT

The specification discloses a brake system (84) which is particularly adapted for vehicles such as skid steer loaders in which the wheels on each side of the vehicle are driven independently by separate transmissions. The brake system (84) includes a caliper assembly (86) overlying brake discs (66) which are mounted for rotation about a common axis but are individually connected to the transmissions. The brake pucks (98) are actuated by a manual lever (132) connected to a rotatable cam (112) associated with an axial plunger (120). The cam (112) is rotatable about an axis parallel to the bore (96) in the caliper assembly (86) containing the brake pucks (98) and plunger (120), to provide a wider range of motion in a more compact space.

8 Claims, 4 Drawing Figures

BRAKE SYSTEM

TECHNICAL FIELD

The present invention relates generally to a brake system, and more particularly to a parking brake system adapted for vehicles such as skid-steer loaders in which the wheels on each side of the vehicle are independently driven by separate transmissions.

BACKGROUND ART

A skid steer loader is a compact, highly maneuverable vehicle in which the wheels on opposite sides of the vehicle are independently driven through separate hydrostatic transmissions. Each transmission typically includes a variable displacement hydraulic pump coupled to a hydraulic motor having an output shaft which is connected by a chain and sprocket arrangement to the other wheels on the same side of the vehicle. The pumps are usually mounted in tandem and driven by a rear mounted engine. Manual controls are connected to displacement cams on the pumps and maneuvering is accomplished by adjusting the rate and direction of output from the pumps through the motors such that the wheels on each side of the vehicle are driven at the desired speeds and in the desired directions to propel and steer the vehicle.

Braking of the vehicle is normally accomplished by placing the controls and their respective pumps in the neutral or null positions to interrupt fluid flow to the hydraulic motors. This technique works reasonably well on level ground while the hydrostatic drive systems are operating, however, it does not provide for possible inadvertent contact with the controls which might cause the skid steer loader to jump out of control. This type of braking generally is not satisfactory during operation over inclined surfaces, and it is not available at all when the hydrostatic drive systems are inoperative or otherwise not functioning properly. There are thus some drawbacks to such hydrostatic braking.

For these reasons, skid steer loaders are usually provided with brake systems which can be locked in engaged position in the manner of parking brakes. There are two basic approaches to such brake systems. One approach has been to provide separate brake assemblies which are individual to each transmission, but which are commonly actuated. This approach, however, is unnecessarily complicated and therefore expensive. In addition, careful adjustment must be maintained to ensure that both brake assemblies are actuated to the same degree at the same time.

Another approach has been to provide a single brake assembly which engages both transmissions. For example, U.S. Pat. No. 4,124,084 discloses a brake system with a common caliper overlying brake discs secured to the motor drive shaft of each hydrostatic transmission. Brake pucks are provided on both sides of each brake disc, and the stack of pucks is actuated by a cam shaft extending transverse to the bore in the caliper containing the pucks. In this system, rotational range of the cam shaft between the engaged and released positions is relatively narrow and permits only limited adjustment to compensate for wear of the brake pucks. Connected to the cam shaft is an actuating lever which overlies the transmission case in an exposed position. Thus, while it does not have some of the disadvantages of separate brakes, the common caliper brake of the type shown in the '084 patent has some other drawbacks, primarily limited operational capability.

A need has thus developed for a new and improved brake system of more compact construction which provides for a wider range of adjustment and which is particularly adapted for use with skid steer loaders.

SUMMARY OF INVENTION

The present invention comprises a brake system which overcomes the foregoing and other difficulties associated with the prior art. In accordance with the invention, there is provided a brake system which is particularly adapted for simultaneous braking of both independently driven sides of a vehicle, such as a skid steer loader. The brake system of the invention includes a caliper assembly overlying a plurality of brake discs mounted for rotation about a common axis. At least one brake disc is drivingly connected to each separately driven side of the vehicle. A transverse bore is defined in the caliper assembly for guiding a plurality of brake pucks, two of which are provided on opposite sides of each brake disc. A stop is provided at one end of the bore for the brake pucks in the caliper assembly. At the other end of the bore is an axial follower or plunger, and an associated rotational cam which is connected by a mechanical linkage to a hand lever. The cam is mounted for rotation about an axis substantially parallel to movement of the plunger and brake pucks. The hand lever is movable between engaged end released positions. In the preferred embodiment, the face of the cam includes a cam surface such that movement of the hand lever rotates the cam and actuates the plunger to compress the brake pucks on the brake discs to effect braking. The mechanical linkage between the hand lever and the cam is preferably an over-center mechanism so that the brake system can be locked in engaged position.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
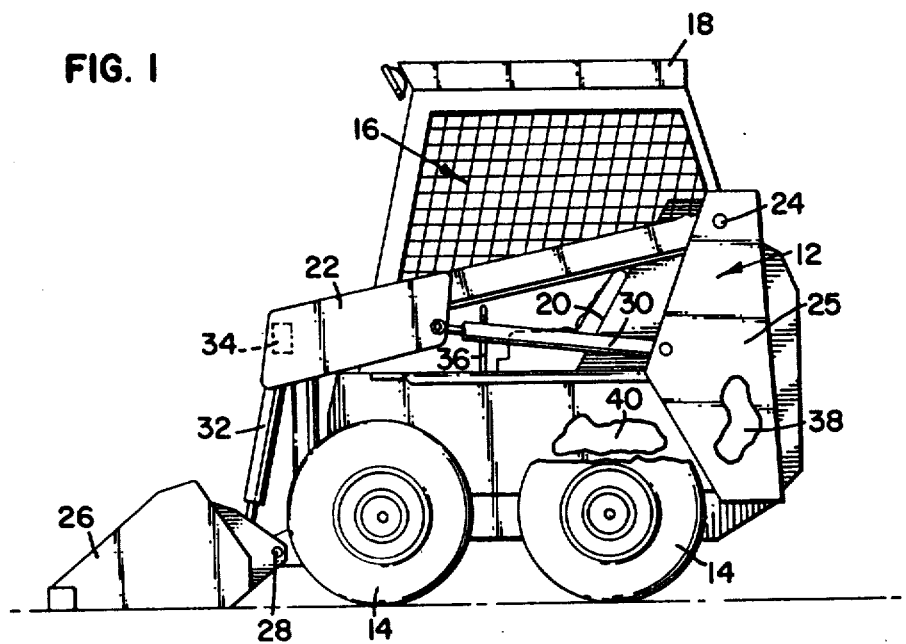
FIG. 1 is a side view of a skid steer loader incorporating the brake system of the invention, in which certain parts have been broken away for clarity.

Referring now to the Drawings, wherein like reference numerals designate like or corresponding elements throughout the views, and particularly referring to FIG. 1, there is shown a skid steer loader 10 for which the brake system of the invention is particularly adapted. The skid steer loader 10 includes a frame 12 with a set of wheels 14 on each side thereof mounted on a relatively short wheelbase. An operator's compartment 16 including a roll cage 18 and a seat 20 is located between a pair of lift arms 22. The inner ends of lift arms 22 are pivoted at points 24 to frame uprights 25 behind the operator's compartment 16. An implement such as a bucket 26 is pivoted at points 28 to the outer ends of the lift arms 22. Raising and lowering of the lift arms 22 is effected by a pair of double acting cylinders 30, one of which is coupled between each lift arm and its corresponding upright 25. Tilting of the bucket 26 is effected by a single double acting cylinder 32 coupled between the bucket and a cross member 34 extending between the lift arms 22.

Suitable controls including foot pedals (not shown) and a T bar handle 36 are provided inside the operator's compartment 16 for controlling the skid steer loader 10. A rear mounted engine 38 drives a tandem pump assembly 40 including two variable displacement hydraulic pumps connected to the hydraulic drive motors of the respective hydrostatic transmissions (not shown) for independently driving the wheels 14 on each side of the loader 10. The T-bar handle 36 is connected to the pump assembly 40 and maneuvering of the skid steer loader 10 is accomplished in the well known manner by manipulating the T-bar handle 36 to effect differential or simultaneous drive of the wheels 14 on each side of the vehicle as desired.

Also provided, as will be explained more fully hereinafter, is the improved brake system of the invention which functions to effect braking of both hydrostatic transmissions of the skid steer loader 10 in a compact and more effective manner and which also provides for a greater range of adjustment.

Figure 2:
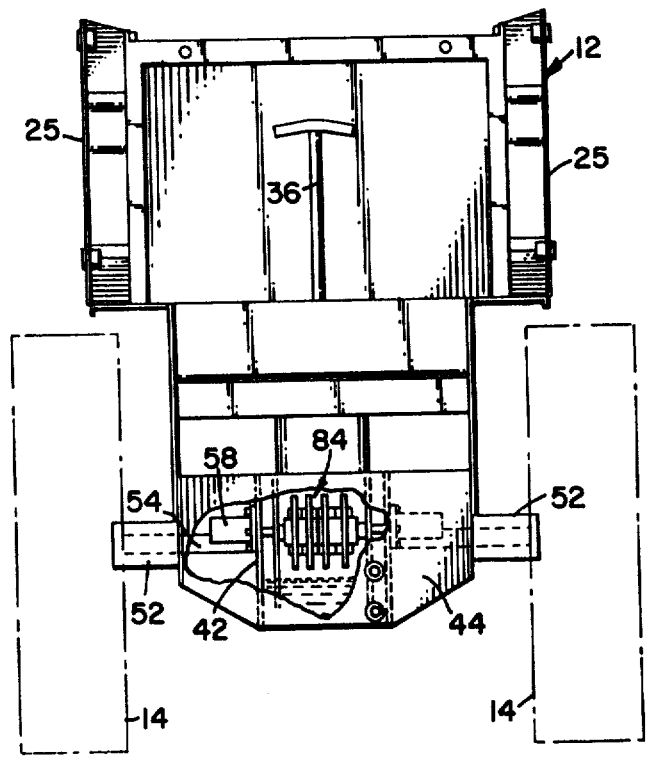
FIG. 2 is a front end view (partially cutaway) of the frame of the skid steer loader shown in FIG. 1.
Figure 3:
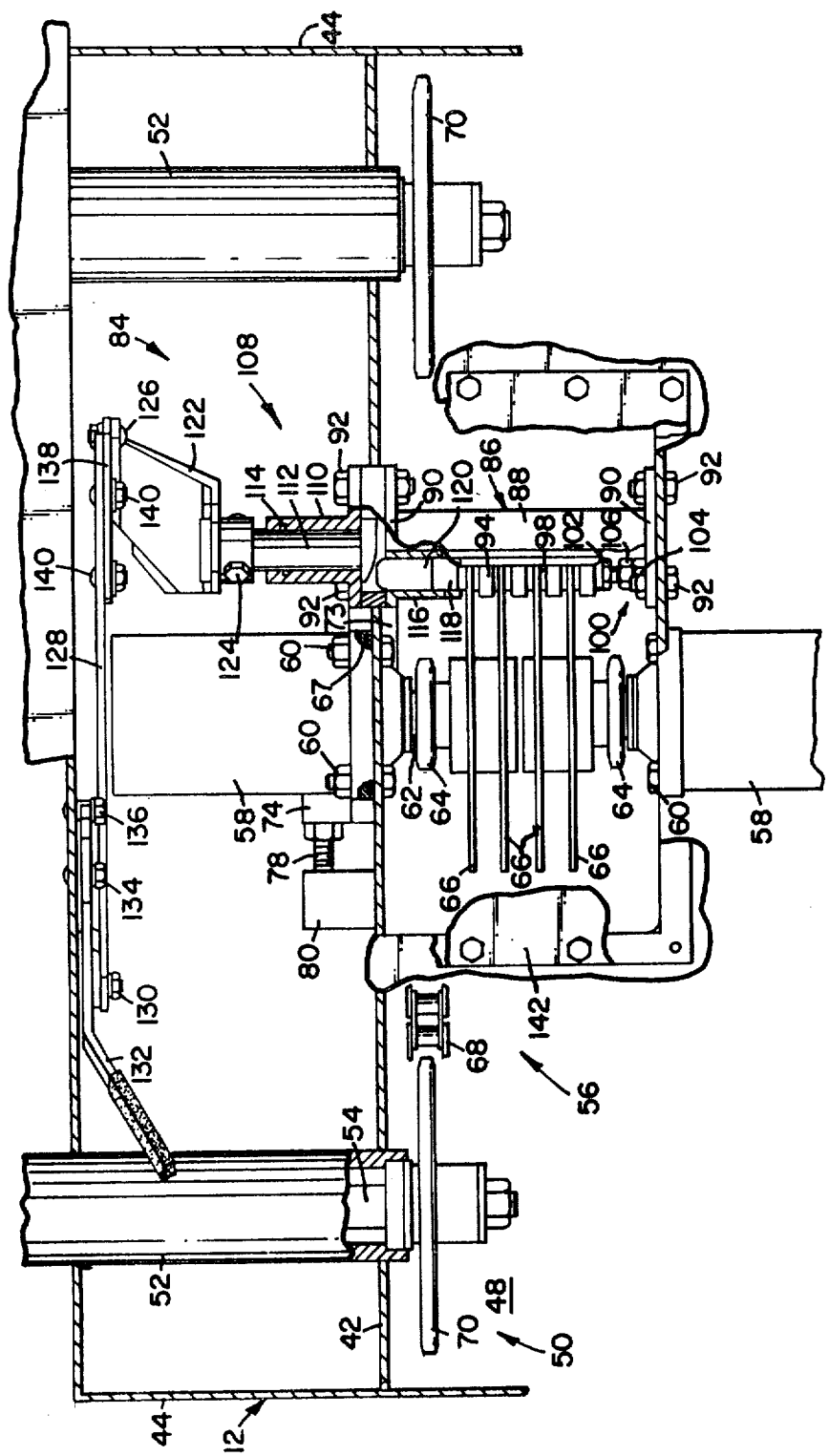
FIG. 3 is a top view of a portion of the frame showing the brake system of the invention, in which certain parts have been broken away for clarity.
Figure 4:
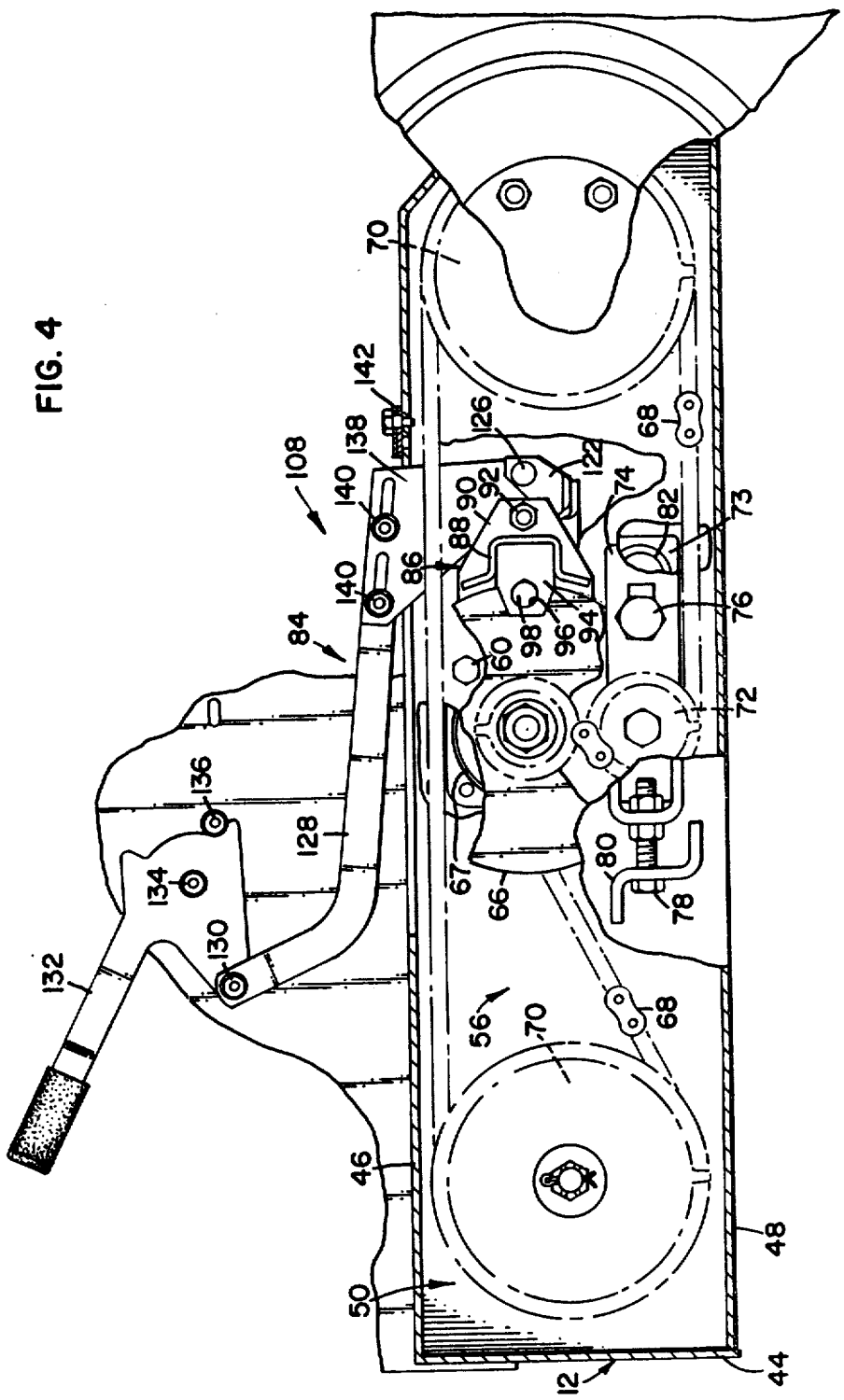
FIG. 4 is a side view of a portion of the frame shown in FIG. 3.

Referring now to FIGS. 2, 3 and 4, further constructional details of the hydrostatic transmissions of the skid steer loader 10 can be seen. The frame 12 includes a pair of laterally spaced apart longitudinal side plates 42, transverse end plates 44 secured across the front and rear ends of the longitudinal plates, and a top plate 46 and bottom plate 48 secured across the tops and bottoms of the longitudinal and lateral plates to define sealed a transmission case 50. Plates 42, 44, 46 and 48 can be formed of steel or other suitable metal welded together. It will thus be appreciated that the transmission case 50 is formed by interconnected structural members extending along each side thereof.

A pair of axle shafts 52 extend outwardly from the transmission case 50 on each side of the frame 12. An axle 54 extends through each axle shaft 52. Wheels 14 are secured to the outer ends of the axles 54, while the inner ends of the axles on each side of the skid-steer loader 10 are connected to their respective hydrostatic transmissions 56. The wheels 14 and associated hydrostatic transmission 56 on each side of the skid steer loader 10 are independently driven by the engine 38 and tandem pump assembly 40, but commonly braked in unison by the brake system of the invention to be explained more fully below.

The hydrostatic transmissions 56 are of substantially symmetrical construction. For clarity, only one transmission 56 and a portion of the other has been shown, however, it will be understood that the case 50 includes two transmissions, one for driving the wheels 14 on each side of the skid steer loader 10. Each hydrostatic transmission 56 includes a hydraulic motor 58 secured by fasteners 60 to the exterior side of the associated side plate 42. The output shaft 62 of the motor 58 extends through an opening in plate 42 and into the transmission case 50. A drive sprocket 64 is mounted on the output shaft 62, together with a pair of brake discs 66. As illustrated, two brake discs 66 are mounted on the output shaft 62, however, it will be understood that only one brake disc or more than two brake discs can be carried thereon as desired depending upon the braking requirements of the vehicle. A gasket or seal 67 is preferably located between the mounting collar of motor 58 and side plate 42 to seal the transmission against fluid loss. The brake disc 66 and the drive sprocket 64 are thus mounted for rotation in unison with the motor 58.

The drive sprocket 64 of each hydrostatic transmission 56 is drivingly connected by a chain 68 to sprockets 70 mounted on axles 54. As illustrated the chain 68 extends in a serpentine course around the drive sprocket 64, driven sprockets 70 and an idler sprocket 72. The idler sprocket 72 is preferably mounted for adjustment to provide for proper tensioning of the chain 68. As is best seen in FIG. 4, the idler sprocket 72 is supported on an inside mounting plate 73 which is adjustably secured, along with an outside plate 74, to the side plate 42 by fasteners 76 extending through elongated holes in the side plate. The outside mounting plate 74 in turn, is connected by a fastener 78 to a bracket 80 secured in fixed position, such as by welding, to the exterior surface of plate 42. As illustrated, fasteners 76 and 78 comprise bolts and nuts. Tensioning of drive chain 68 can thus be accomplished by loosening the fasteners 76, manipulating fastener 78 as necessary to reposition the mounting plates 73 and 74 and idler sprocket 72 and thus adjust tension of the chain, and then tightening fastener 76 to secure the idler sprocket 70 in position. A gasket or seal 82 is preferably provided between plates 73 and 42 to seal the transmission case 50 against fluid loss.

It will thus be appreciated that the hydrostatic transmissions 56 are of substantially identical construction and symmetrical disposition. Each transmission 56 includes a motor 58 located outside of the transmission case 50, which normally contains hydrostatic fluid such that chains 68 and sprockets 64, 70 and 72 operate continuously in a bath of lubricant. The motors 58 are located in opposing relationship such that the brake disks 66 rotate about a common axis, but are independently driven by the separate transmissions.

With particular reference to FIGS. 3 and 4, there is shown the brake system 84 of the invention. The brake system 84 includes a caliper assembly 86 extending adjacent to and overlying the edges of the brake discs 66. The caliper assembly 86 includes a cross piece 88 connected between a pair of side plates 90 secured by bolts 92 to the side walls 42. A plurality of inserts 94 are secured to the cross piece 88 in laterally spaced apart relationship to define slots overlying the brake discs 66. Each insert 94 includes a circular aperture therein and together the inserts define a transverse bore 96 for a stack of brake pucks 98, a pair of which are provided on opposite sides of each brake disc 66. As illustrated, the caliper assembly 86 comprises a welded assembly, however, a cast or forged assembly could also be used.

As is best seen in FIG. 3, a stop 100 is provided at one side of the caliper assembly 86 for closing one end of the transverse bore 96 and engaging the endmost brake puck 98. Stop 100 is preferably axially adjustable. The adjustable stop 100, as illustrated, includes a bolt 102 mounted in a nut 104 secured to the associated end plate 90. Bolt 102 and nut 104 are coaxial with the transverse bore 96. The head of bolt 102 functions as an end stop whose axial positioning can be adjusted by turning the bolt. A jam nut 106 is provided for securing bolt 102 in the desired position after adjustment.

An actuator assembly 108 is located at the other end of the caliper assembly 86 for compressing the brake pucks 98 on the brake discs 66 to effect simultaneous braking of both hydrostatic transmissions 56 of the skid steer loader 10. The actuator assembly 108 includes a collar 110 mounted on the outside of the side plate 42 and secured directly to the associated end plate 90 by fasteners 92. A cam 112 is mounted for rotation within the collar 110 and a circular seal 114 is preferably provided between the inside of the collar and shaft of the cam. A bushing or sleeve 116 is mounted on the associated end plate 90 coaxial with the bore 96, but slightly off set from the bore of collar 110. An intermediate spacer 118 and axial follower or plunger 120 are disposed within the sleeve 116 and the next adjacent insert 94 for transferring the compression force from cam 112 to the other endmost brake puck 98 and in turn to the entire stack of brake pucks. As shown, the outer end of plunger 120 is rounded and the face of the cam 112 includes a spiral camming surface which urges the plunger axially inward upon rotation of the cam.

The use of spacer 118 is not required, however, inclusion of the spacer can facilitate interchangeability in adapting the brake system 84 to other applications with minimal modifications.

A manual control is provided for actuating the cam 112. An arm 122 is secured to the outer end of cam 112 by fastener 124. The arm 122 in turn is connected by a pin 126 to one end of a link 128, which is connected at the other end by a pin 130 to a hand lever 132. Manipulation of the hand lever 132 thus causes axial rotation of the cam 112, which in turn urges the plunger 120 and optional spacer 118 inwardly to compress the brake pucks 98 and thus arrest movement of both transmissions 56.

In accordance with the preferred construction, the hand lever 132 is pivoted to an upright panel of frame 12 at point 134, and is of the over center type such that the brake system 84 can be locked in the engaged position. A stop 136 cooperates with the hand lever 132 to define the engaged and released positions of the brake system 84. The hand lever 132 is shown in the released position in FIGS. 3 and 4. A plate 138 is preferably connected between link 128 and arm 126 by a pair of fasteners 140 and corresponding elongate slots to facilitate adjustment of the brake system 84. A removable access cover 142 is preferably provided on the top plate 46 of transmission case 50 to facilitate access to and maintenance of transmissions 56 and brake system 84.

Although the brake discs 66 of transmissions 56 have been shown mounted on the output shafts 62 of the respective motors 58, it will be appreciated that the brake discs need not necessarily be mounted on the shafts of the drive motors. For example, the brake discs can be mounted on coaxial jack shafts which are drivingly connected to transmissions 56. The important thing is that the brake disks 66 rotate about a common axis so that they can be actuated by a common caliper assembly 86.

From the foregoing, it will thus be apparent that the present invention comprises a brake system incorporating several advantages over the prior art. The brake system herein is particularly suited for use with skid steer vehicles, but it can also be utilized with other types of vehicles having hydrostatic transmissions for independently driving the wheels on each side of the vehicle. The brake system herein utilizes a cam mounted for rotation about an axis off set and substantially parallel, instead of transverse, to the bore containing the brake pucks in order to achieve a more direct and compact construction. Use of a parallel cam allows a wider range of rotational movement of the cam and thus axial adjustment of the plunger, which in turn facilitates overall adjustment of the brake system as the brake pucks wear down. Other advantages will be evident to those skilled in the art.

Although particular embodiments of the invention have been illustrated in the accompanying Drawings and described in the foregoing Detailed Description, it will be understood that the invention is not limited to the specific embodiments disclosed, but is intended to embrace any equivalents, alternatives, modifications and/or rearrangements of elements falling within the scope of the invention as defined by the following claims.

We claim:

1. A brake system for a vehicle having separate independently driven transmissions, comprising:
    a plurality of brake discs mounted for rotation about a common axis, each brake disc being drivingly connected to one of said transmissions;
    a caliper assembly associated with said brake discs, said caliper assembly including a transverse bore and longitudinal slots overlying said brake discs;
    a stop associated with one end of the bore of said caliper assembly;
    a slidable plunger disposed in the other end of the bore of said caliper assembly;
    a plurality of brake pucks slidably disposed in the bore of said caliper assembly between said plunger and said stop, and on opposite sides of each brake disc;
    a cam associated with said plunger, said cam being mounted for rotation about an axis substantially parallel to but offset from the bore in said caliper assembly, said cam having at least a partial spiral camming surface at one end adapted for engagement with said plunger; and
    means for selectively effecting rotation of said cam to actuate said plunger and compress said brake pucks and discs together to arrest movement of said transmissions.

2. The brake system of claim 1, wherein said caliper assembly comprises:
    a pair of laterally spaced apart end plates
    a cross piece secured between said end plates; and
    a plurality of inserts secured to said cross piece, said inserts being laterally spaced apart to define the slots overlying said brake disks and including coaxial apertures therein defining the transverse bore for said brake pucks.

3. The brake system of claim 1, wherein said stop is axially adjustable.

4. The brake system of claim 1, wherein said means for selectively effecting rotation of said cam comprises:
    an arm connected to said cam;
    a manual lever movable between engaged and released positions; and
    a link coupled between said lever and arm.

5. A brake system for a vehicle having separate independently driven transmissions, which comprises:
    a plurality of brake discs mounted for rotation about a common axis, each brake disc being drivingly connected to one of said transmissions;
    a caliper assembly associated with said brake discs, said caliper assembly including longitudinal slots overlying the edges of said brake discs;
    a plurality of brake pucks mounted for sliding movement in said caliper assembly in a direction transverse to said brake discs, two brake pucks being located on opposite sides of each brake disc;

an adjustable stop located at one side of said caliper assembly for engaging an endmost brake puck;

a plunger located at the other side of said caliper assembly and mounted for axial movement relative to the other endmost brake puck;

a cam associated with said plunger, said cam being mounted for rotation between engaged and released positions about an offset axis substantially parallel to movement of said plunger, said cam having at least a partial spiral camming surface at one end adapted for engagement with said plunger; and a manual lever connected to said cam for selective actuation of said plunger to effect axial compression of said brake pucks on said brake discs and thereby arrest movement of said transmissions.

6. The brake system of claim 5, wherein said caliper assembly comprises:

a pair of laterally spaced apart end plates;

a cross piece secured between said end plates; and a plurality of inserts secured to said cross piece, said inserts being laterally spaced apart to define the slots overlying said brake discs and including coaxial openings therein defining a transverse bore for said brake pucks.

7. The brake system of claim 5, further including:

an arm connected to said cam;

a link connected to said manual lever; and means for adjustably connecting said link and arm to adjust relative rotational positioning of said cam and plunger.

8. In a skid steer loader having separate transmissions with coaxial drive shafts for independently driving the wheels on opposite sides of the vehicle, a brake system comprising:

a plurality of brake discs, each brake disc being mounted for rotation on one of said drive shafts;

a caliper assembly, said caliper assembly including a transverse bore and longitudinal slots overlying portions of said brake discs;

a plurality of brake pucks slidable within the transverse bore of said caliper assembly and located on opposite sides of said brake discs;

an axially adjustable stop positioned at one side of said caliper assembly in engagement with one endmost brake puck;

a slidable plunger disposed in the transverse bore at the other side of said caliper assembly in engagement with the other endmost brake puck;

a cam associated with said plunger, said cam having at least a partial spiral camming surface at one end and being mounted for rotation between engaged and released positions about an offset axis substantially parallel to the bore in said caliper assembly;

a manual lever for actuating said cam;

an arm connected to said cam; and means for adjustably connecting said lever and arm to adjust rotational positioning of said cam relative to said plunger.

* * * * *